(12) United States Patent
Swope et al.

(10) Patent No.: US 8,002,054 B2
(45) Date of Patent: Aug. 23, 2011

(54) ROOF DRILL BIT, ROOF DRILL BIT BODY AND HARD CUTTING INSERT FOR ROOF DRILL BIT

(75) Inventors: Chad A. Swope, Bedford, PA (US); Douglas E. Bise, Chilhowie, VA (US); Kris E. Strothmann, Mt. Vernon, IL (US); Tod D. Hill, Madisonville, KY (US)

(73) Assignee: Kennametl Inc., Latrobe, PA (US)

( * ) Notice: Subject to any disclaimer, the term of this patent is extended or adjusted under 35 U.S.C. 154(b) by 0 days.

(21) Appl. No.: 12/321,779

(22) Filed: Jan. 26, 2009

(65) Prior Publication Data

US 2010/0187019 A1    Jul. 29, 2010

(51) Int. Cl.
 *E21B 10/62* (2006.01)
 *E21B 10/60* (2006.01)
(52) U.S. Cl. .................... 175/427; 175/420.1
(58) Field of Classification Search ............. 175/420.1, 175/427
 See application file for complete search history.

(56) References Cited

U.S. PATENT DOCUMENTS

| | | | |
|---|---|---|---|
| 3,089,552 A * | 5/1963 | Black et al. ............... | 175/400 |
| 3,415,332 A * | 12/1968 | Bower, Jr. ................ | 175/420.1 |
| 4,190,125 A * | 2/1980 | Emmerich et al. ......... | 175/420.1 |
| 4,492,278 A * | 1/1985 | Leighton ................... | 175/420.1 |
| 4,515,230 A * | 5/1985 | Means et al. .............. | 175/420.1 |
| 4,550,791 A * | 11/1985 | Isakov ....................... | 175/420.1 |
| 4,627,665 A | 12/1986 | Ewing et al. | |
| 5,220,967 A | 6/1993 | Monyak | |
| 5,287,937 A * | 2/1994 | Sollami et al. ............. | 175/427 |
| 5,452,628 A * | 9/1995 | Montgomery et al. ..... | 76/108.2 |
| 6,145,606 A * | 11/2000 | Haga ......................... | 175/420.1 |
| 6,260,638 B1 * | 7/2001 | Massa et al. ................ | 175/427 |
| 6,595,305 B1 * | 7/2003 | Dunn et al. ................ | 175/420.1 |
| 6,684,968 B2 | 2/2004 | Bise et al. | |
| 6,860,344 B2 * | 3/2005 | Bise et al. .................. | 175/430 |
| 6,915,867 B2 | 7/2005 | Bise | |
| 6,945,340 B2 | 9/2005 | Bise et al. | |
| 7,100,714 B1 * | 9/2006 | Sollami ...................... | 175/427 |
| 7,168,511 B2 | 1/2007 | Woods et al. | |
| 7,360,845 B2 | 4/2008 | Ojanen | |
| 2004/0065483 A1 * | 4/2004 | Sollami ...................... | 175/420.1 |
| 2008/0302577 A1 * | 12/2008 | Pile ............................ | 175/427 |
| 2010/0187019 A1 * | 7/2010 | Swope et al. .............. | 175/427 |

* cited by examiner

*Primary Examiner* — Jennifer H Gay
(74) *Attorney, Agent, or Firm* — Matthew W. Smith

(57) ABSTRACT

A roof drill bit has an elongate roof drill bit body, which has a forward end and a rearward end. The roof drill bit body contains a slot at the forward end. The roof drill bit body contains a dust port wherein the dust port has a central longitudinal dust axis. The roof drill bit further has a hard insert received within the slot wherein the hard insert has a leading surface. The leading surface of the hard insert is rotationally forward of the central longitudinal dust axis of the dust port.

17 Claims, 13 Drawing Sheets

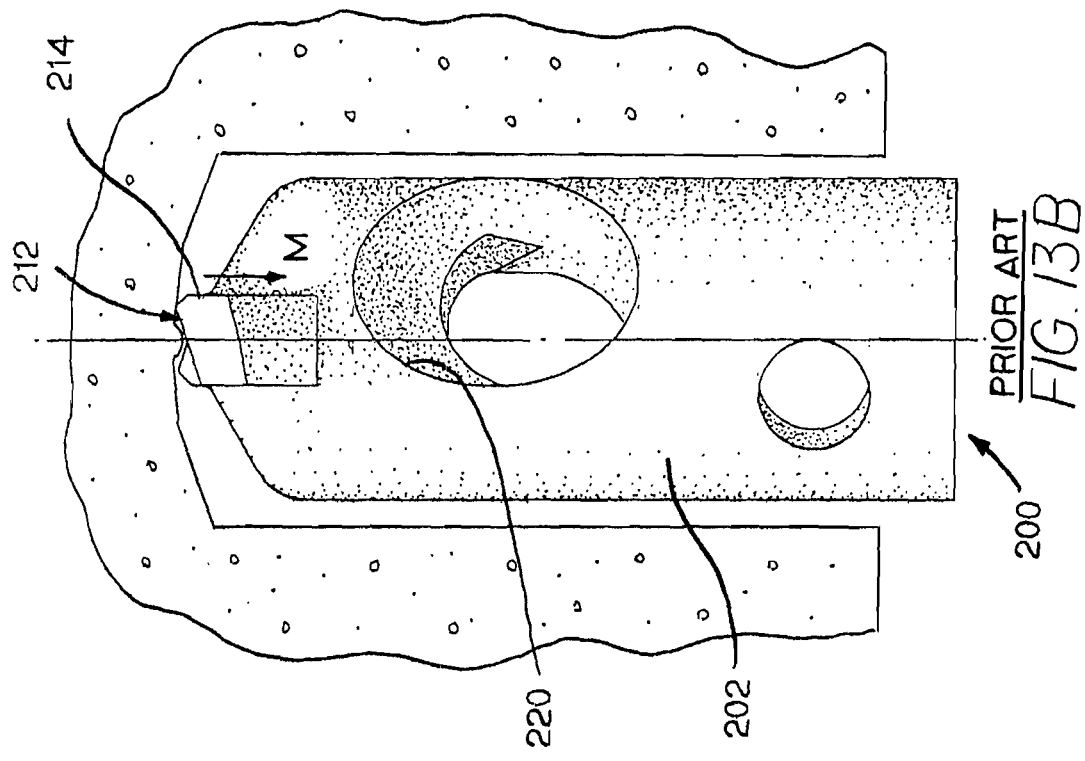
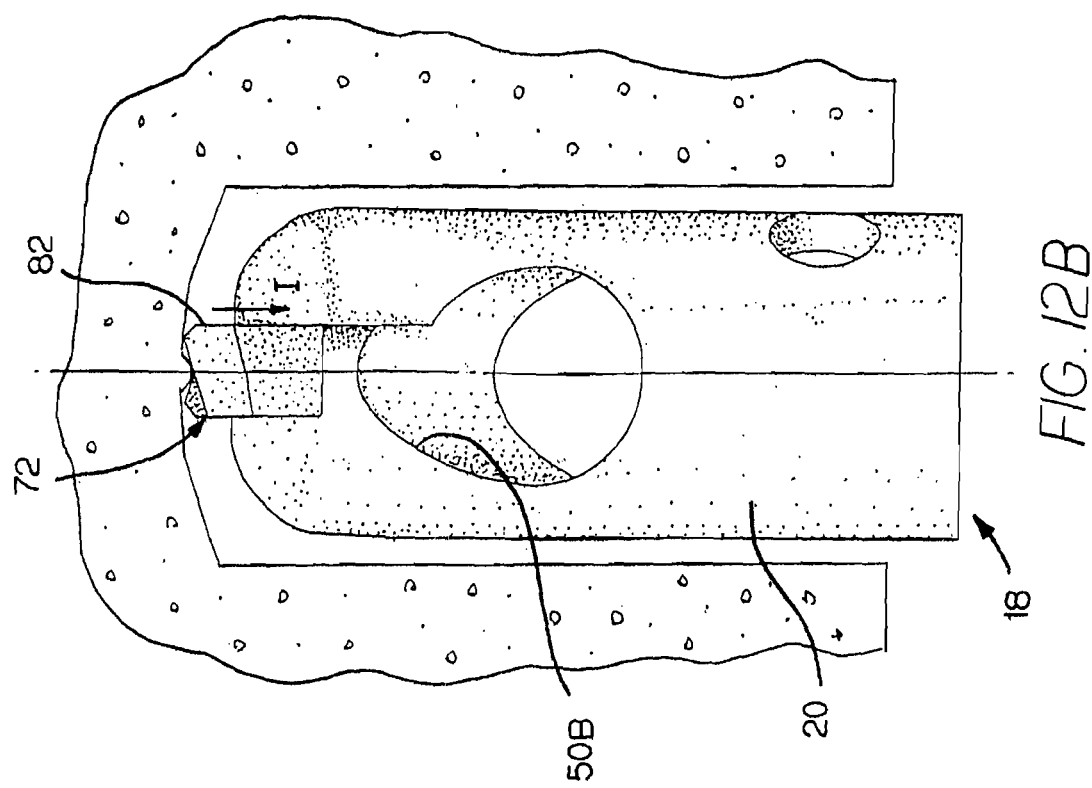

ROOF DRILL BIT, ROOF DRILL BIT BODY AND HARD CUTTING INSERT FOR ROOF DRILL BIT

BACKGROUND

The invention pertains to a roof drill bit, as well as a roof drill bit body and a hard cutting insert for use in a roof drill bit, that has a typical use of drilling boreholes in mine roofs. More particularly, the invention pertains to a roof drill bit, as well as a roof drill bit body and a hard cutting insert for use in a roof drill bit, that exhibits an improvement in the performance of drilling boreholes in a roof bolting operation due to an improvement in drilling debris evacuation and hard cutting insert retention. The major components of the roof drill bit, i.e., the roof drill body and the hard cutting insert, facilitate these performance improvements. U.S. Pat. No. 5,200,967 to Monyak, U.S. Pat. No. 6,595,305 B1 to Dunn et al., U.S. Pat. No. 6,684,968 B2 to Bise et al., U.S. Pat. No. 6,915,867 B2 to Bise, U.S. Pat. No. 6,945,340 B2 to Bise et al., and U.S. Pat. No. 7,168,511 B2 to Woods et al. disclose exemplary roof drill bits. Each one of these patents is hereby incorporated by reference herein.

Expansion of an underground mine (e.g., a coal mine) requires digging a tunnel that initially has an unsupported roof. To provide support for the roof, an operator drills boreholes using a roof drill bit wherein the boreholes can extend from about two feet to twenty feet into the earth strata. The roof drill bit attaches to a drill steel, which connects to a rotary driver. The rotary driver powers the roof drill bit to drill the boreholes. The operator then affixes roof bolts within the boreholes and a roof support (e.g., a roof panel) connects to the roof bolts to support the roof of the underground mine.

As one can appreciate, the drilling operation generates drilling debris. It is important to remove this drilling debris from the vicinity of the borehole. One typical way to remove or evacuate drilling debris from the vicinity of the borehole is to exert a vacuum at dust ports in the roof drill bit body. Under the vacuum, drilling debris passes through the dust ports and through a bore of a hollow drill steel into a debris collector. The debris collector is away from the borehole.

Although earlier roof drill bits, which utilize a vacuum to evacuate drilling debris, operate in a satisfactory fashion, there remains a need to improve upon the operation of the roof drill bit. More specifically, there is need to need to provide an improved roof drill bit that exhibits an improvement in the evacuation of drilling debris.

Roof drill bits operate at high rotational speeds. For example, a typical rotational speed is 650 rpm (revolutions per minute). When operating at such speeds, typically the drilling debris does not directly enter the dust port, but travels about the circumference of the roof drill bit prior to entering a dust port. In other words, the drilling debris does not directly enter the dust port closest to the point of engagement generating the drilling debris. Instead, the drilling debris travels about the circumference of the roof drill bit body prior to entry into a dust port that is not the dust port closest to the point of engagement. Significant disadvantages result from the inability of earlier roof drill bits to evacuate drilling debris directly through the dust ports.

One such disadvantage is excessive abrasive wear on the surface of the drill bit body. The drilling debris exhibits abrasive characteristics so that as the roof drill bit rotates at high speeds, drilling debris between the earth strata defining the borehole and the roof drill bit body abrades the roof drill bit body. Such abrasion reduces the underlying support for the hard cutting insert, which over time may result in a premature removal of the roof drill bit from service, i.e., a reduction in the expected useful tool life. It would be highly desirable to provide an improved roof drill bit that provides for an improvement in the evacuation of drilling debris under the influence of the vacuum at the dust ports.

Another significant disadvantage associated with the inability of earlier roof drill bits to evacuate drilling debris directly through the dust ports is an increase in the tendency of the roof drill bit to become stuck once the roof drill bit ceases operation. The presence of drilling debris between the roof drill bit and the earth strata defining the borehole can make removal of the roof drill bit-drill steel assembly difficult. The drilling debris actually can frictionally hold or retain the roof drill bit within the borehole. Thus, upon cessation of the rotation of the roof drill bit, an attempt by the operator to remove the roof drill bit-drill steel assembly may encounter problems. For example, the operator may be unable to remove the entire roof drill bit-drill steel assembly without great difficulty. As another example, during an attempt to remove the roof drill bit-drill steel assembly from the borehole, the drill steel may disengage from the roof drill bit. The result is that the roof drill bit remains stuck in the borehole. As one can appreciate, these difficulties decrease the overall production efficiency of the mining operation. Thus, they would be highly desirable to provide an improved roof drill bit that better evacuates drilling debris so as to reduce or eliminate drilling debris retained between the earth strata defining the borehole and the roof drill bit.

Typically, a roof drill bit uses a cemented carbide hard insert, which is at the axial forward end of the roof drill bit body, to first impinge the substrate or earth strata. The hard insert is brazed within a slot at the axial forward end of the roof drill bit body so there is a braze joint between the roof drill bit body and the hard insert. Typically, an increase in braze joint area generally leads to an increase in the braze joint strength. Such an increase in braze joint strength facilitates better retention of the hard insert to the roof drill bit body. Better drilling efficiencies result from using a roof drill bit with better retention of the hard insert (or cutting member) thereto. Thus, it would be highly desirable to provide an improved roof drill bit with a braze joint between the hard insert and the roof drill bit body that exhibits a greater braze joint area than heretofore.

In a roof drill bit, the roof drill bit body provides support for the hard insert affixed thereto. Heretofore, the roof drill bit body has not provided full support for the hard insert affixed thereto. In other words, the roof drill bit body does not contact or support the entire bottom surface of the hard insert, but instead, the corners of the hard insert adjacent the cutting edges lack support by the roof drill bit body. The lack of such support can lead to the loss of the hard insert, which can equate to a premature failure of the roof drill bit. Thus, it would be highly desirable to provide an improved roof drill bit that provides full support to the hard insert affixed thereto.

The working environment of an underground mine has inherent dangers due to an unsupported roof. Thus, it is advantageous to be able to drill the boreholes in an efficient fashion to minimize the time the roof is without support. One can increase the overall efficiency of the drilling operation by providing a roof drill bit that better evacuates drilling debris through the dust ports thereof. One can increase the overall efficiency of the drilling operation by providing a roof drill bit that better retains the hard insert to the roof drill bit body during the drilling operation.

SUMMARY

In one form thereof, the invention is a roof drill bit comprising an elongate roof drill bit body, which has a forward end and a rearward end. The roof drill bit body contains a slot at the forward end and a dust port wherein the dust port has a central longitudinal dust axis. The roof drill bit further has a hard insert, which is received within the slot, with a leading surface. The leading surface of the hard insert is rotationally forward of the central longitudinal axis of the dust port.

In another form thereof, the invention is a roof drill bit body that comprises an elongate body member, which has a forward end and a rearward end. The elongate body member contains a slot in the forward end thereof whereby the slot bisects the forward end of the elongate body member into opposite symmetric portions. The roof drill bit body further contains an interior bore therein. The roof drill bit body contains a pair of dust ports wherein each one of the dust ports corresponds with a corresponding symmetric portion. Each of the symmetric portions has a twisted helical surface wherein the twisted helical surface has an axial rearward termination at its corresponding dust port. Each one of the twisted helical portions has a minimum transverse dimension. The sum of the minimum transverse dimensions of the pair of the twisted helical portions is equal to the inside transverse dimension of the interior bore in the roof drill bit body.

In still another form thereof, the invention is a hard insert for use with a roof drill bit wherein the roof drill bit contains a slot at the axial forward end thereof. The hard insert comprises a hard insert body with a bottom surface with opposite transverse ends. The bottom surface has one transverse surface adjacent one of the transverse ends and another transverse surface adjacent the other of the transverse ends. The bottom surface has a mediate arched portion mediate of and contiguous with the one transverse surface and the other transverse surface,

BRIEF DESCRIPTION OF THE DRAWINGS

The following is a brief description of the drawings that form a part of this patent application:

FIG. 12B is a side view of the specific embodiment of the roof drill bit of FIG. 6 wherein the roof drill bit is at another orientation, which is rotated forward ninety with respect to the orientation of FIG. 12A, within a borehole in the drilling operation;

FIG. 13B is a side view of the specific embodiment of the PRIOR ART roof drill bit of FIGS. 11A and 11B wherein the roof drill bit is at another orientation, which is rotated forward ninety degrees with respect to the orientation of FIG. 13A, within a borehole in the drilling operation.

DETAILED DESCRIPTION

Figure 1:
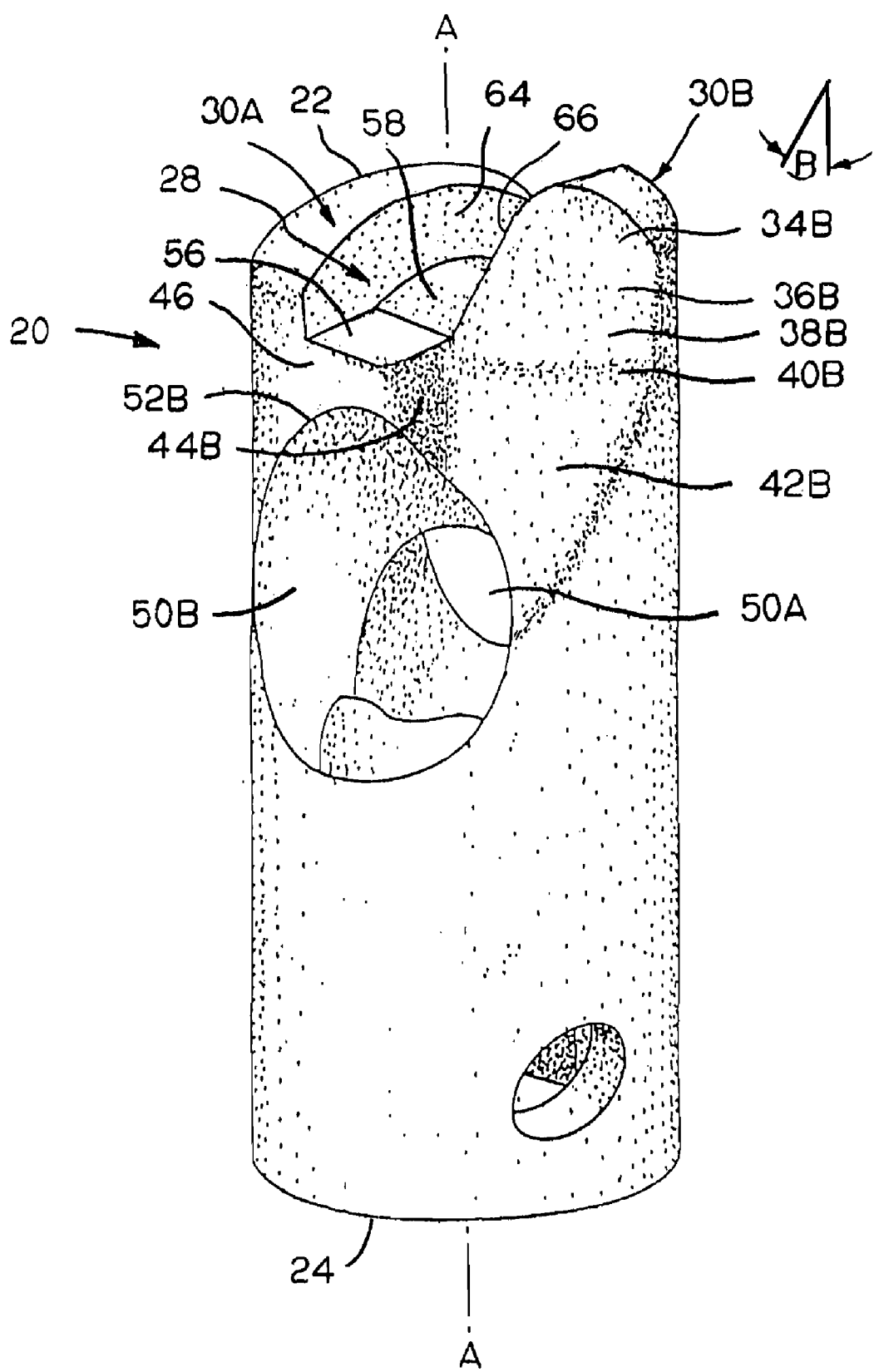
FIG. 1 is an isometric view of a specific embodiment of a roof drill bit body.

Referring to FIG. 1 there is shown a specific embodiment of a roof drill bit body generally designated as 20, which is a principal components of the overall roof drill bit 18. Roof drill bit body 20 has an axial forward end 22 and an axial rearward end 24. Roof drill bit body 20 has a central longitudinal body axis A-A. The preferred method to make the roof drill bit body 20 is cold-forming. As will become apparent from the discussion hereinafter, using cold-forming techniques to make the roof drill bit body 20 result in a number of advantages that improve the overall performance of the roof drill bit itself. U.S. Pat. No. 6,915,867 B2 to Bise (assigned to Kennametal Inc. of Latrobe, Pa.) discloses a roof drill bit body made via cold-forming techniques.

Although the preferred manufacturing technique is cold-forming, there should be an appreciation that powder metallurgical techniques are also suitable to make the roof drill bit body 20. Powder metallurgical techniques provide the opportunity to employ a wide variety of materials for the manufacture of the roof drill bit body. This is in contrast to manufacturing processes that require machining or extensive machining.

Roof drill bit body 20 contains a diametrical slot 28 in the axial forward end 22 thereof. The diametrical slot 28 essentially separates the axial forward end 22 into two generally symmetrical portions generally pointed out as one symmetrical portion 30A and another (opposite) symmetrical portion 30B.

Still referring to FIG. 1, symmetrical portion 30B, which is to the right of the diametric slot 28 as viewed in FIG. 1, presents the following surfaces moving in an axial rearward direction. The axial forwardmost surface is a forward arcuate surface 34B. The forward arcuate surface 34B then blends into the forward-mediate surface 36B, which, in turn, blends into the rearward-mediate surface 38B. The rearward-mediate surface 38B blends into the rearward surface 40B, which in turn blends into the helical twisted surface 42B. The helical twisted surface 42B has a helical orientation at a helix angle "B". Helix angle B may range between about 10 degrees and about 50 degrees. The preferred helix angle B is about 30 degrees. The helical twisted surface 42B has a preferred pitch equal to 4.375 inches. The pitch of the twisted helical surface 42B may range between about 0.1 inches and about 5 inches. The helical twisted surface 42B extends in the axial rearward direction and leads into the dust port 50B so that as it moves in the axial rearward direction it finally terminates at its corresponding dust port 50B.

There should be an appreciation that the geometry of the first four of the above-mentioned surfaces (i.e., forward arcuate surface 34B, forward-mediate surface 36B, rearward-mediate surface 38B, and rearward surface 40B) does not have to be exactly like these surfaces are described herein. These surfaces may take on any suitable geometry so long as they function to direct or divert drilling debris impinging thereon toward the helical twisted surface 42B. Although it will be described hereinafter, the drilling debris travels over the helical twisted surface 42B and into the dust port 50B under the influence of a vacuum exerted at the dust port 50B.

Overall, the one symmetrical portion 30A provides surfaces that direct drilling debris along the surface thereof into dust port 50A. The other symmetrical portion 30B provides surfaces that direct drilling debris along the surfaces thereof into dust port 50B. This drilling debris is the resultant debris from the drilling/cutting by the adjacent cutting edge of the hard insert. The drilling debris can be in the form of dust and small particulates. Drilling debris may also include larger particles and pieces of the earth strata.

An upstanding surface 44B is adjacent to the helical twisted surface 42B. Upstanding surface 44B functions as a barrier to help maintain the flow of drilling debris toward the dust port 50B. In this regard, any drilling debris flowing in a radial inward direction over the twisted helical surface 42B may impinge upstanding surface 44B, which directs the drilling debris back toward the twisted helical surface 42B. The presence of the upstanding wall 44B facilitates the more efficient delivery of drilling debris to the dust port.

The other symmetrical portion 30A is geometrically similar to the one symmetrical portion 30B. In this regard, the symmetrical portion 30A contains the same geometrical features as symmetrical portion 30B, and functions the same way with regard to the evacuation of drilling debris.

As is apparent from the drawings, drilling debris entering the dust ports passes directly into the central interior bore of the roof drill bit. Under the influence of a vacuum, the drilling debris then passes into the hollow drill steel (not illustrated). The hollow drill steel functions as a conduit to carry the drilling debris to a collector.

Figure 3:
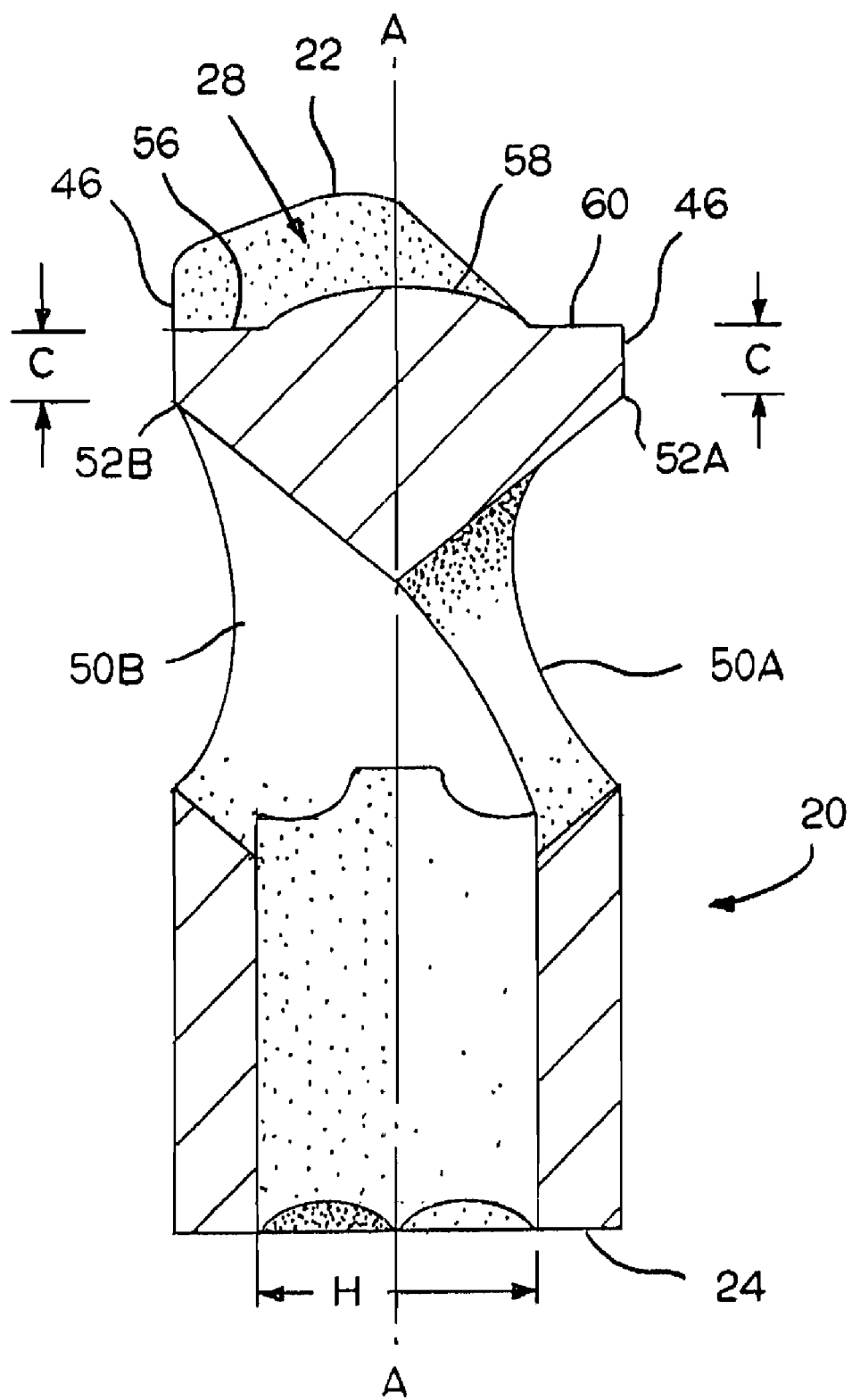
FIG. 3 is a cross-sectional view of the roof drill bit body of FIG. 1 taken along section line 3-3 of FIG. 4.
Figure 4:
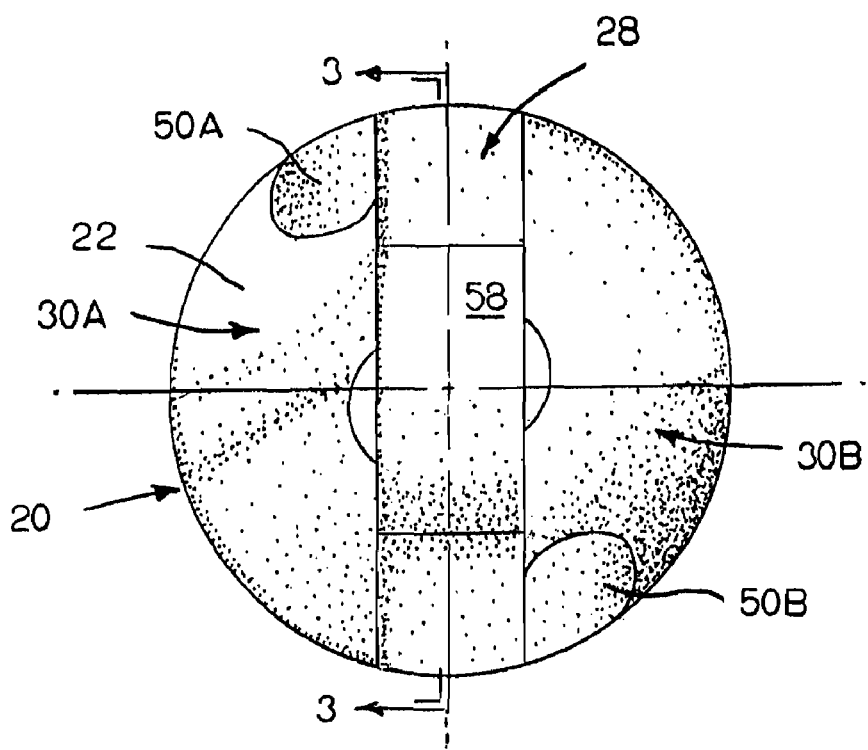
FIG. 4 is a top view of the roof drill bit body of FIG. 1.

As especially shown in FIG. 3, diametrical slot 28 has one generally planar peripheral transverse surface portion 56 wherein one end of the one transverse surface portion 56 terminates at the peripheral surface 46 of the drill bit body 20. The other end of the one transverse surface portion 56 is contiguous with an arched (arcuate) surface portion 58. Arched surface 58 presents an arcuate surface. The arched surface portion 58 is contiguous at its one end with the one peripheral transverse surface portion 56. The arched surface portion 58 is contiguous at its other end with another peripheral transverse surface portion 60, which terminates at the peripheral surface 46 of the drill bit body 20. The arched surface portion 58 is centered along the transverse dimension in the slot 28. Since the arched surface portion 58 is centered in the slot 28, the transverse length of each one of the peripheral transverse surface portions (56, 60) is the same.

The diametrical slot 28 has a pair of opposite upstanding side surfaces 64 and 66. These side surfaces 64, 66 are generally parallel to the longitudinal axis A-A of the roof drill bit body 20. The bottom surface and the opposite side surfaces 64, 66 together define the diametrical slot 28.

Figure 8:
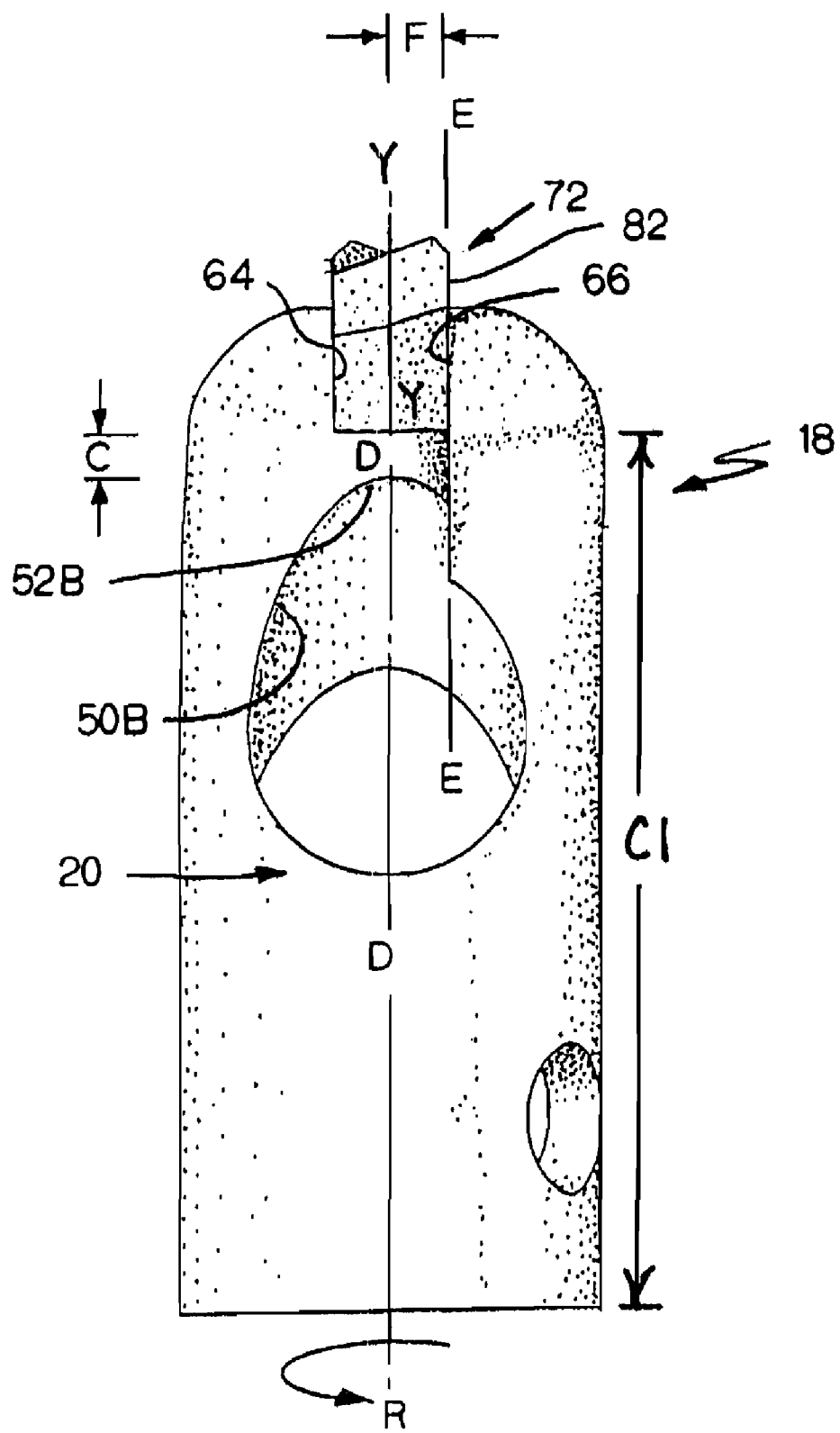
FIG. 8 is a side view the specific embodiment of the roof drill bit of FIG. 6 wherein the roof drill bit is at an orientation that is ninety degrees forward of the orientation of FIG. 7.
Figure 9:
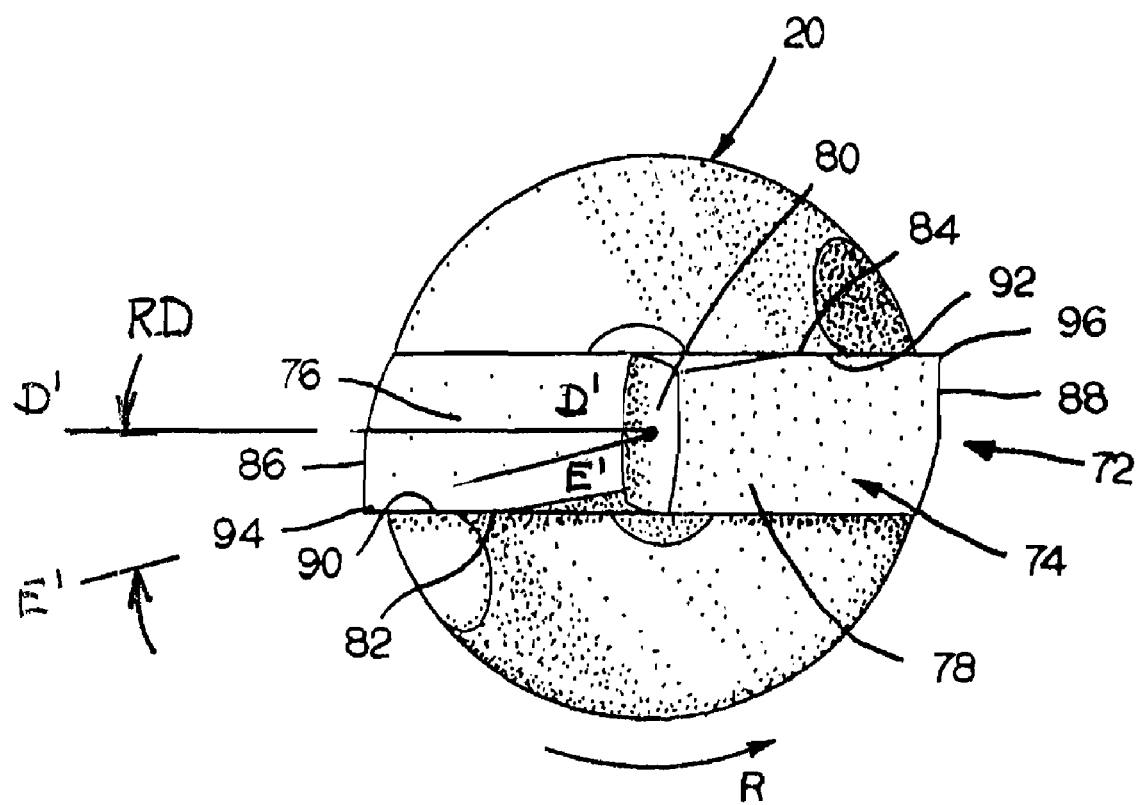
FIG. 9 is a top view of the specific embodiment of the roof drill bit of FIG. 6.

Referring especially to FIGS. 8 and 9, roof drill bit 18 further contains a hard insert (or hard cutting member) generally designated as 72. Hard cutting member 72 typically comprises a hard material such as, for example, cemented (cobalt) tungsten carbide. Conventional cemented (cobalt) tungsten carbide materials useful for a hard cutting member 72 include a composition of cobalt-tungsten carbide wherein the cobalt ranges between about 2 weight percent and about 12 weight percent with the balance tungsten carbide and recognized impurities. More specifically, a preferred composition fot eh hard cutting member 72 comprises about 6 weight percent cobalt and the balance tungsten carbide and recognized impurities. There should be an appreciation that there is no intention to limit the scope of the invention by the recitation of specific cemented carbide compositions or ranges for the cemented carbide compositions. It is the claims that define the true spirit and scope of the invention.

Hard insert 72 has a top (or axial forward) surface 74, which presents two inclined surfaces 76 and 78. A notch 80 separates the inclined surfaces 76, 78. Hard cutting insert 72 further has a pair of side surfaces 82, 84 and a pair of opposite edge surfaces 86, 88. Each one of the side surfaces (76, 78) intersects with its corresponding inclined surfaces (76, 78) and edge surface (86, 88), respectively, to form a radial cutting edge (90, 92), respectively, and a peripheral cutting edge (94, 96), respectively. These cutting edges engage the earth strata so that upon rotation of the roof drill bit 18, they cut (drill) a borehole. Such drilling generates drilling debris (including dust and larger particles and pieces of the earth strata).

Figure 10:
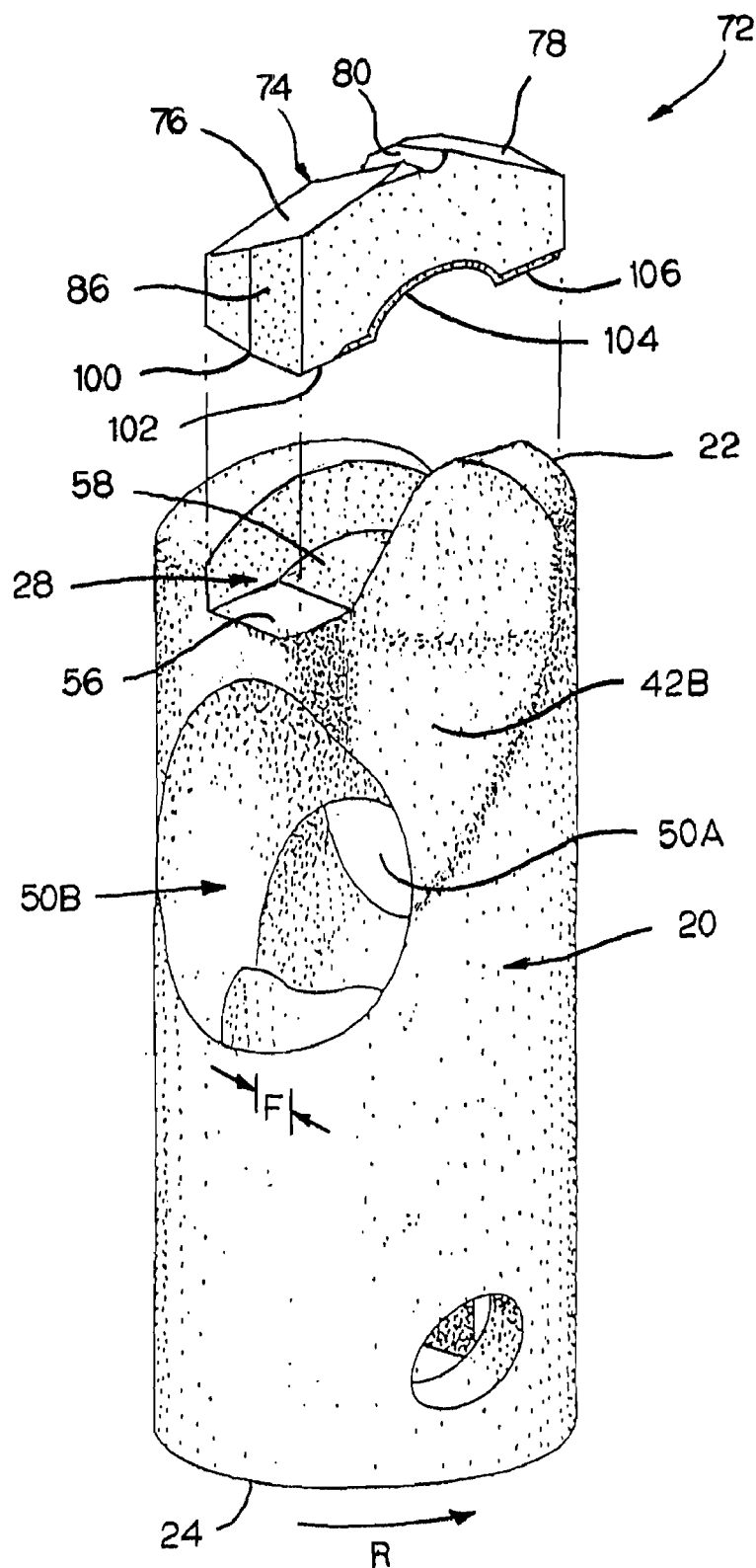
FIG. 10 is an isometric view of the specific embodiment of the roof drill bit of FIG. 6 with the hard insert exploded away from the roof drill bit body.

Referring to FIG. 10, hard insert (or cutting member) 72 has a generally planar bottom surface generally designated as 100. The bottom surface 100 has one transverse generally planar surface portion 102 wherein one end of the one transverse surface portion 102 terminates at the one end of the hard insert and the other end is contiguous with an arched (or arcuate) surface portion 104. The arched surface portion 104 at its one end is contiguous with the one transverse surface portion 102. The arched surface portion 104 at its other end is contiguous with the other transverse surface portion 106. The transverse generally planar surface portion 106 terminates at the other end of the hard cutting member 72.

Brazing is a typical method useful to attach or affix the hard insert 72 to the roof drill bit body 20 within the diametrical slot 28. Hence, there is a braze joint between the bottom surface of the hard cutting member 72 and the surfaces that define the diametrical slot 28. Typical braze alloys useful in this kind of application include high temperature braze alloys. More specifically, these kinds of braze include the following: Handy HI TEMP 548 braze alloy, manufactured and sold by Handy & Harmon, Inc., 859 Third Avenue, New York, N.Y. 10022. HANDY HI-TEMP 548 braze alloy has a nominal composition (in weight percent) of 54.0-56.0% copper; 5.5-6.5% nickel; 3.5-4.5% manganese; 0.01-0.40% silicon; the balance is zinc except for a maximum content of other elements equal to 0.50 weight percent. There should be an appreciation that there is no intention to limit the scope of the invention by the recitation of a specific braze alloy. It is the claims that define the true spirit and scope of the invention.

When the hard cutting member 72 is affixed within the diametrical slot 28, the bottom surface 100 of the hard cutting member 72 is adjacent the surface of the diametrical slot 28. More specifically, the one transverse surface portion 102 is adjacent the one transverse surface portion 56 of the slot 28. The arched surface 104 is adjacent the arched surface 58 of the slot 28. The other transverse surface portion 60 is adjacent the other transverse surface portion 106 of the slot 28. These services are adjacent one another rather than against one another because of the presence of the braze joint (i.e., a layer of braze alloy) therebetween. Further, as is apparent from the drawings, the surfaces of the slot 28 are complimentary to or correspond to the bottom surface of the hard insert 72. The arched surface 58 of the slot 28 is of the same degree of curvature as the arched surface 104 of the hard insert 72.

The geometry of the corresponding surfaces of the bottom surface of the hard cutting member and the surfaces of the slot facilitate retention of the hard cutting member 72 within the slot 28. In this regard, there are two aspects of the joinder between the hard insert and the slot in the roof drill bit body that facilitate excellent retention of the hard insert in the slot (or on the roof drill bit body).

The first aspect is the existence of a braze joint with an increase in braze joint surface area in comparison to a braze joint between adjacent flat or generally planar surfaces. The increase in braze joint surface area occurs due to the presence of the arched surface 58 in the notch 28 and the corresponding arched surface portion 104 in the bottom surface of the hard insert 72. The presence of the corresponding arched surfaces (58, 104), which have the same degree of curvature, also present an abutment or abutting surfaces that help resist the impact of any lateral forces exerted on the hard insert 72.

Figure 7:
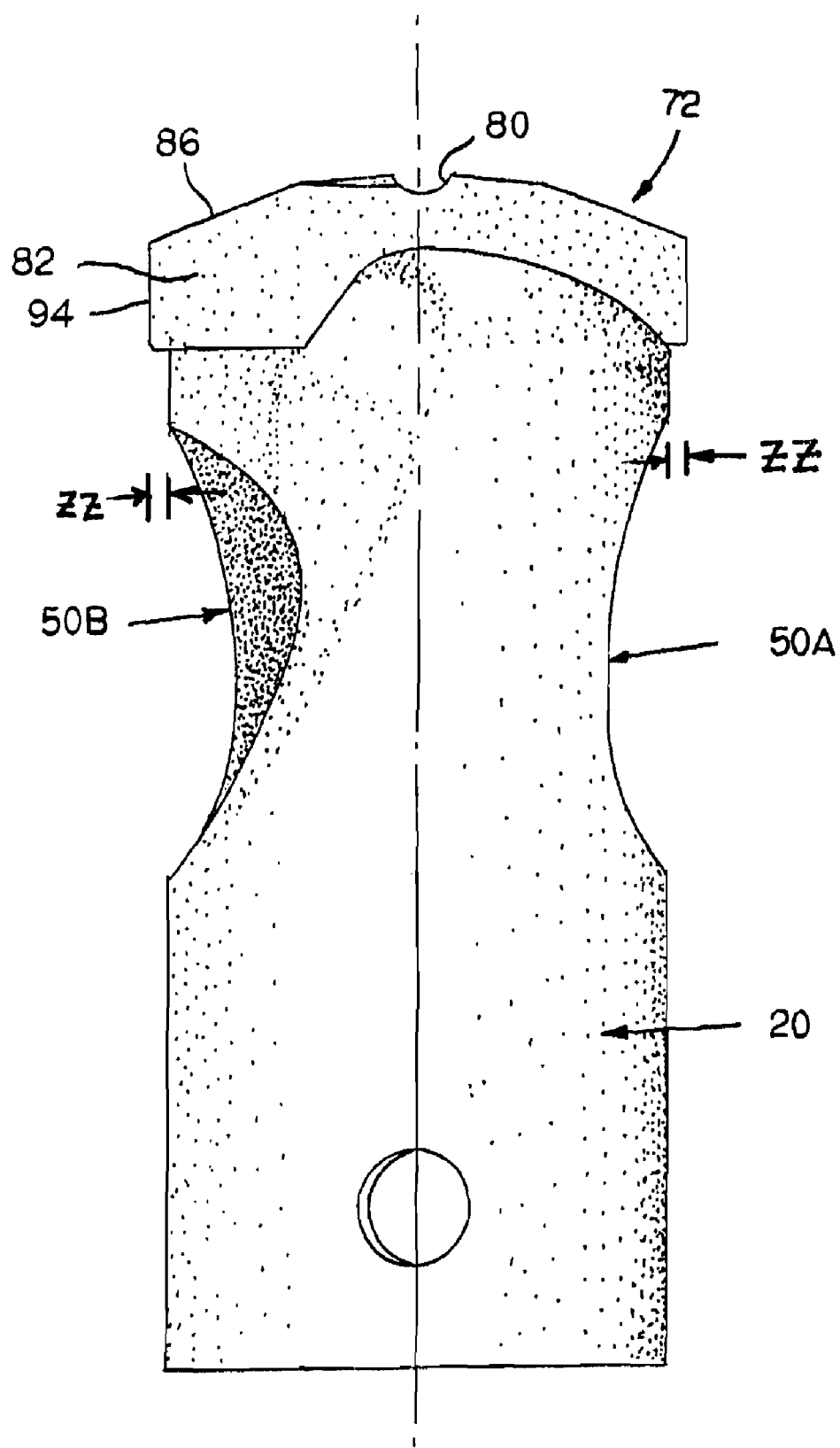
FIG. 7 is a side view of the specific embodiment of the roof drill bit of FIG. 6 wherein the roof drill bit is at one orientation.

As shown especially in FIG. 7, the second aspect is the existence of essentially full support along essentially all of the bottom surface of the hard insert 72. As shown in FIG. 7, the length of the hard insert 72 that is unsupported, which is "ZZ" in FIG. 7, is minimal. More specifically, in the specific embodiment, the extent of the hard insert 72 that is unsupported is about 7.7 percent, i.e., about 92.3 percent of the axial length of the hard insert 72 is supported by the drill bit body. In reference to a range, the extent of the hard insert 72 that is unsupported ranges between about 2 percent and about 20 of the axial length of the hard insert 72, i.e., between about 80 percent and about 98 percent of the axial length of the hard insert 72 is supported by the drill bit body. In other words, there is an essentially full footprint of the hard insert 72 on the bottom surface of the slot 28. This relationship between the hard insert 72 and the slot 28 is also apparent from other drawings such as FIG. 10. This so-called full footprint provides additional support by the roof drill bit body 20 for the hard insert 72. Such an increase in the extent of support provided by the roof drill bit body 20 results in an increase in the capability of the roof drill bit 18 to retain hard insert 72.

The full footprint also leads to an increase in the overall braze joint surface area. As discussed above, an increase in braze joint surface area enhances the capability of the roof drill bit to retain the hard insert.

Figure 11A:
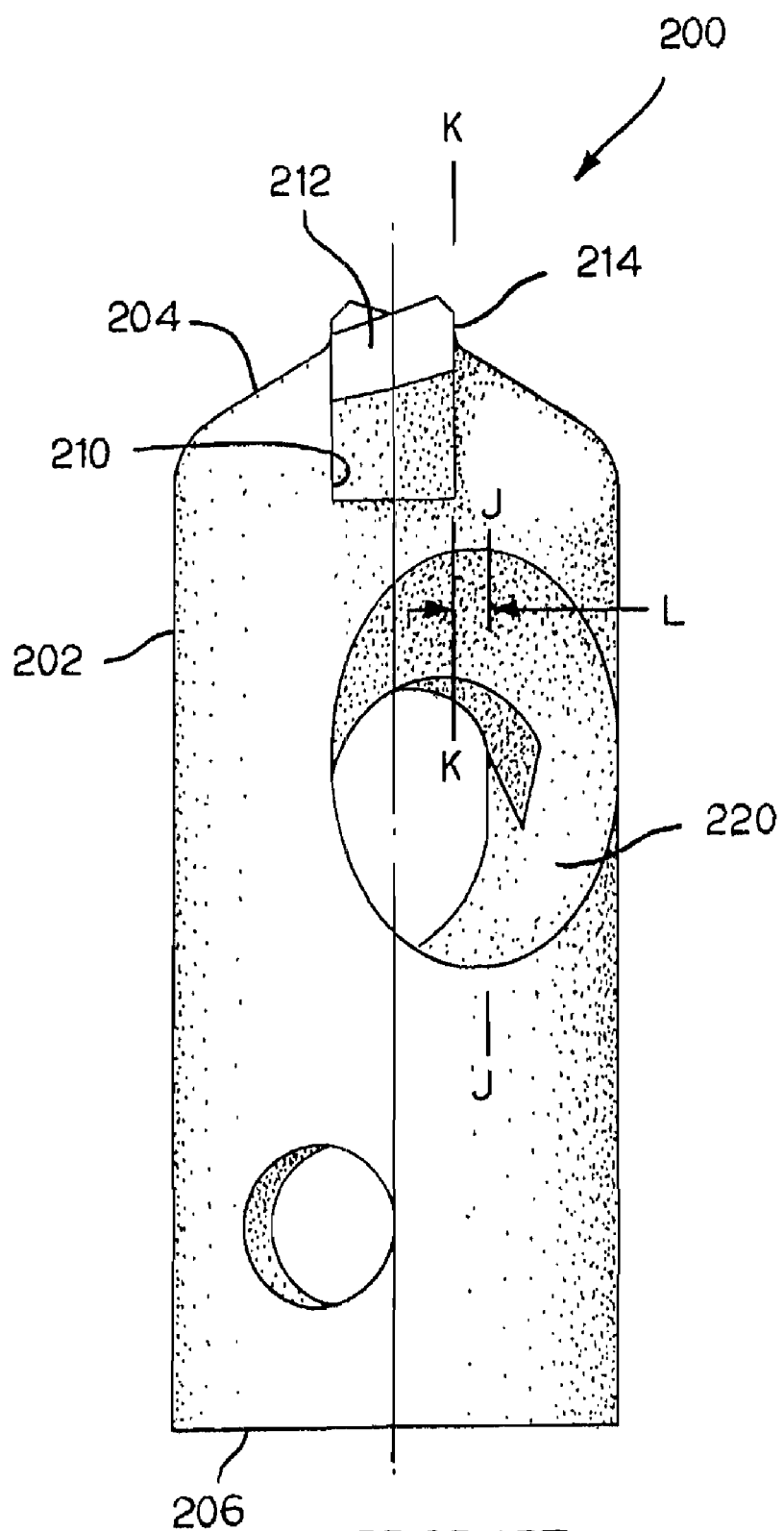
FIG. 11A is a side view of a PRIOR ART roof drill bit.
Figure 11B:
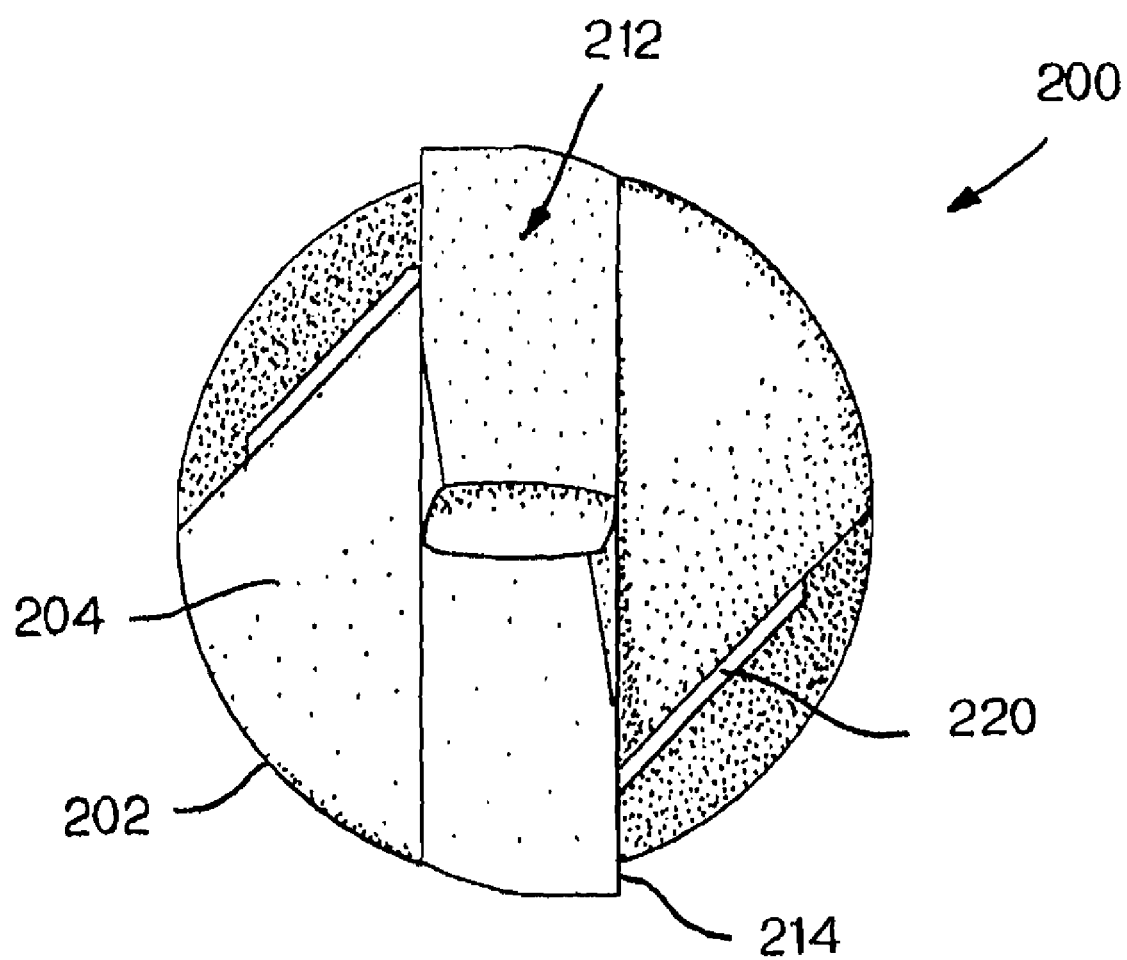
FIG. 11B is a top view of the PRIOR ART roof drill bit of FIG. 11A.

The so-called full footprint of the inventive roof drill bit is in stark contrast to the support to the hard insert by the prior art roof drill bit as shown in FIGS. 11A and 11B. FIG. 11B shows that each corner of the hard insert 212 adjacent the cutting edge lacks support underneath this part of the hard insert.

It thus becomes apparent that the geometry of the corresponding surfaces of the hard insert 72 and slot 28 contribute to increasing the capability of the roof drill bit 18 to retain the hard insert 72 thereto.

There is another feature provided by the corresponding cooperative geometry of the hard insert 72 and a slot 28. The cooperation between the arched surface 58 of the hard insert 72 and the arched surface 104 of the slot 28 provide a self-centering feature. In other words, since the geometry of the arched surface 58 and arched surface 104 are complementary (or correspond to each other), cooperation therebetween results in the correct orientation or positioning of the hard insert 72 relative to the slot 28. The self-centering feature is an advantageous manufacturing-related feature of the present invention. It improves manufacturing efficiencies since it ensures the correct relative positioning of the hard insert 72 in the slot 28 to the roof drill bit body 20.

In reference to the location or orientation of the dust ports (50A, 50B), each of the dust ports 50A and 50B is axial rearward of the diametrical slot 28. In this regard, referring to dust port 50B as an example, the axial forward edge 52B of dust port 50B is a distance "C" axial rearward of the bottom surface of the diametrical slot 28. It is preferred that this distance "C" range between about 5.3 percent and about 53.4 percent of the axial distance (C1 in FIG. 8) between the bottom surface of the slot 28 and the bottom surface of the roof drill bit body. In one specific embodiment, the distance C is equal to 0.12 inches and the distance C1 is equal to 1.873 inches so that the distance "C" is about 6.4 percent of the axial distance (C1 in FIG. 8) between the bottom surface of the slot 28 and the bottom surface of the roof drill bit body.

Referring to FIG. 8, dust port 50 presents a generally circular or oval shape. Dust port 50 has a central vertical (or longitudinal) dust axis D-D, which is generally parallel to the central longitudinal axis A-A of the roof drill bit body 20. The hard insert 72 as an orientation in the slot 28 such that the leading surface (which is the one side surface 82) adjacent cutting edge 90 and peripheral cutting edge 94 is generally parallel to the longitudinal axis A-A of the rotatable cutting bit body 20. Line (E-E) is along the surface of leading surface 82. Line E-E is generally parallel to the central longitudinal dust axis D-D and to the central longitudinal axis A-A of the roof drill bit body 20.

Still referring to FIG. 8, one can see that each one of the dust ports (50A and 50B) has an orientation such that the longitudinal axis (D-D) thereof is rotationally rearward of the corresponding leading surface 82 of the hard insert 72. FIG. 8 shows that axis D-D is spaced apart a distance "F" from line E-E. Herein, the term "rotationally rearward" means in the context of the relationship between the dust port 50B and hard insert 72, that the longitudinal axis (D-D) of the dust port 50B will pass a selected location after the leading surface 82 (see line E-E) passes that same location during rotation of the roof drill bit 18. In other words, during operation, the leading surface 82 of the hard insert 72 will first travel past a selected location in relation to the central longitudinal axis (D-D) of the dust port 50B.

As used herein, the term "rotationally forward" means the opposite of the term "rotationally rearward". In other words, when the central longitudinal axis (D-D) of the dust port 50B is rotationally rearward of the leading surface 82 of the hard insert 72, the leading surface 82 is rotationally forward of the central longitudinal axis (D-D) of the dust port 50B. More specifically, when during operation the leading surface 82 travels past a selected location before the central longitudinal axis (D-D) of dust port 50B) travels past that same point, the surface 82 is rotationally forward of the central longitudinal axis (D-D) of dust port 50B. When in operation, the central longitudinal axis (D-D) of the dust port 50B travels past a selected location after the leading surface 82 (see line E-E) travels past that same location, the central longitudinal axis (D-D) of dust port 50B is rotationally rearward of the leading surface 82.

In this specific embodiment of the roof drill bit 18, the leading surface 82 is rotationally forward of the central longitudinal axis (D-D) of dust port 50B. Central longitudinal axis (D-D) of the dust port 50 be is rotationally rearward of the leading surface 82 of the hard insert 72.

Referring to FIG. 8 and FIG. 9, as described above, in the orientation shown in FIGS. 8 and 9, the central longitudinal axis (D-D) of dust port 50B is in vertical alignment with the central transverse axis Y-Y of the hard insert 72. The leading surface 82 of the hard insert 72 (see line E-E) is rotationally forward of the longitudinal axis (D-D) of dust port 50B. This relationship is also show in FIG. 9, but in the content of a rotational angle. More specifically, the angle "RD" defines the rotational relationship between the longitudinal axis (D-D) of dust port 50B and the leading surface 82. In FIG. 9, the line D'-D' is aligned with the longitudinal axis (D-D) of dust port 50B. Line E'-E' passes through the peripheral cutting edge 94 on the leading surface 82. The angle between the lines D'-D' and E'-E' comprises angle RD, which is the extent the leading surface 82 is rotationally forward of the longitudinal axis (D-D) of dust port 50B. Here, the specific angle RD is equal to 15 degrees. There should be an appreciation that the angle RD can vary up to about 10 degrees in either the clockwise direction or the counter-clockwise direction from the angle RD as shown in FIG. 9. In other words, angle RD can range between about 5 degrees and about 25 degrees whereby the leading surface 82 is rotationally forward of the longitudinal axis (D-D) of dust port 50B. In still another range, angle RD can range between about 10 degrees and about 20 degrees whereby the leading surface 82 is rotationally forward of the longitudinal axis (D-D) of dust port 50B.

As will be explained hereinafter, the orientation of the dust ports, as well as the geometry of the surfaces leading to the dust ports, provides for enhanced evacuation of drilling debris through the dust ports from the vicinity of the drilling operation. Such enhanced debris evacuation improves the overall operation of the roof drill bit.

Figure 2:
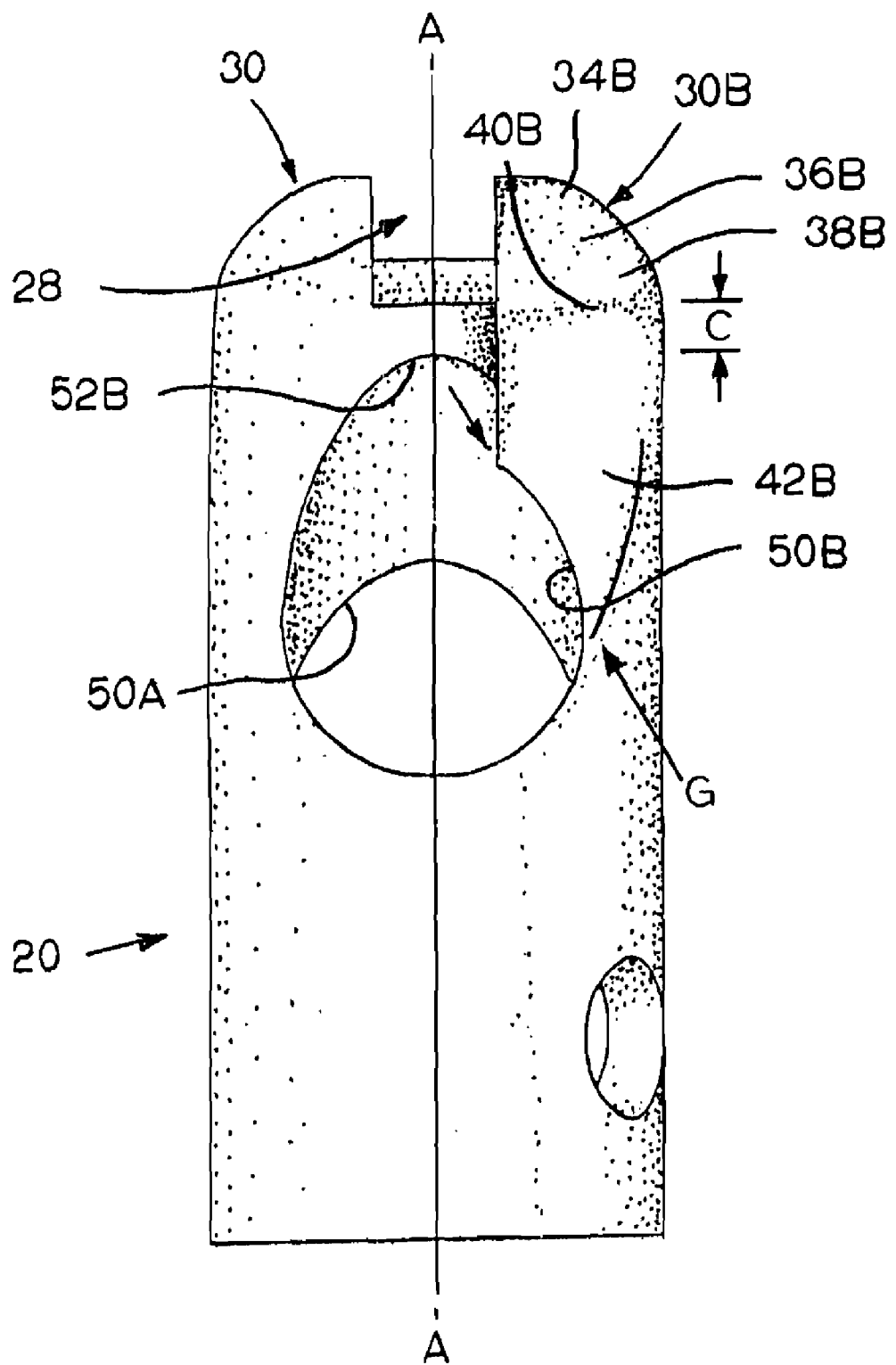
FIG. 2 is an isometric side view of the specific embodiment of the roof drill bit body of FIG. 1.

Referring to FIG. 2, the twisted helical surface 42B as a minimum transverse dimension "G", which is at the location where the twisted helical surface 42B terminates at the dust port 50B. One should appreciate that the minimum transverse dimension G is measured in a direction that is transverse (i.e., ninety degrees) to the longitudinal axis of the twisted helical surface at the point where it terminates in the dust port.

Figure 5:
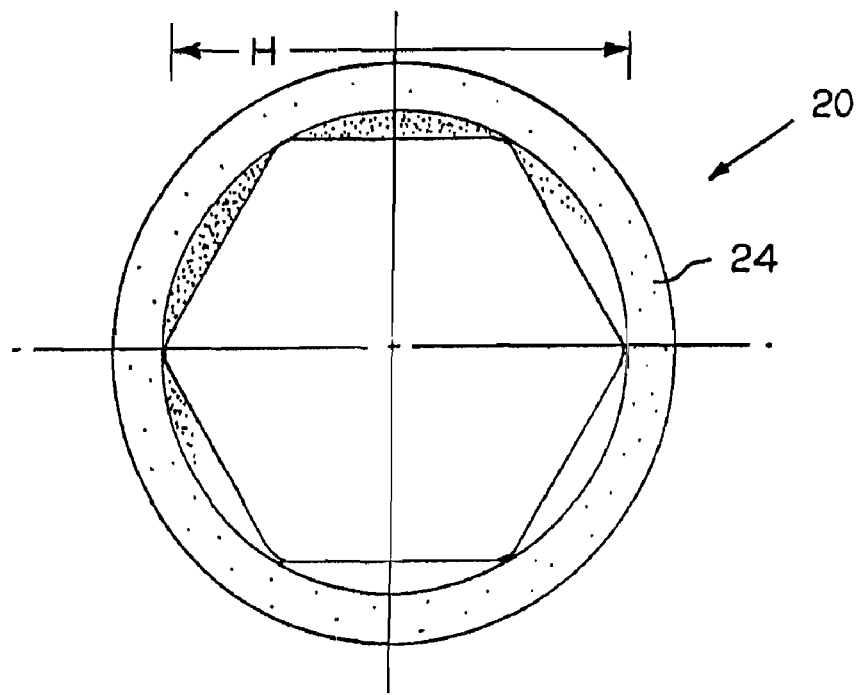
FIG. 5 is a bottom view of the roof drill bit body of FIG. 1.
Figure 6:
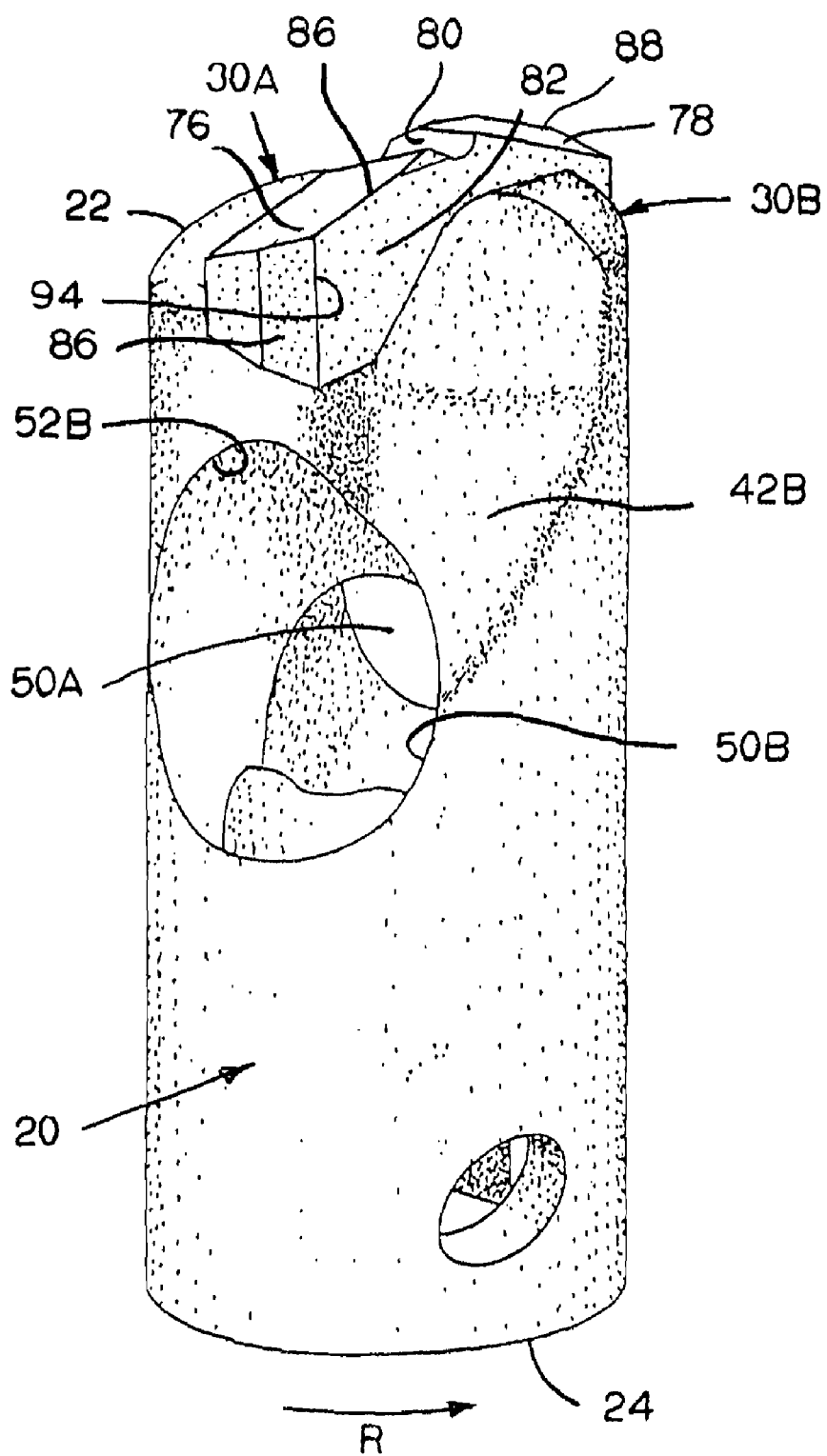
FIG. 6 is an isometric view of a specific embodiment of a roof drill bit using the specific embodiment of the roof drill bit body of FIG. 1.

The sum of the minimum transverse dimension "G" for the twisted helical surfaces (42A, 42B) is preferably equal to the inside diameter "H" (see FIGS. 3 and 5) of the roof drill bit body 20. Another option is that the sum of the minimum transverse dimension "G" for the twisted helical surfaces (42A, 42B) is less than the inside diameter "H" of the roof drill bit body 20.

This dimensional relationship provides for a significant advantage to the operation of the roof drill bit. By maintaining the sum of the minimum transverse dimensions of the helical twisted surfaces to be equal to or less than the inside diameter of the roof drill bit body, the roof drill bit in all likelihood will not have the tendency to choke or clog with excessive drilling debris. In other words, such a limitation on the minimum transverse dimension (or width) of the helical twisted surfaces will keep an excessive volume of drilling debris from entering the dust ports (50A and 50B), and hence, reduce the tendency of the roof drill bit to choke or clog with drilling debris.

The orientation of the hard cutting member 72 relative to the dust ports 50A and 50 B facilitates evacuation of the drilling debris from the vicinity of the drilling operation. In reference to the orientation as discussed above, FIG. 8 shows that the leading surface 82 of the hard insert 72 presents a longitudinal orientation such that line E-E passing through the leading surface 82 is rotationally forward of the central longitudinal axis (D-D) of the dust port 50B by a distance "F". The presence of this rotationally forward offset of the leading surface 82 to the central longitudinal axis D-D of the dust port 50B facilitates the efficient and direct evacuation of drilling debris in to the dust ports.

As can be seen in a comparison between the specific embodiment of the roof drill bit 18 of the invention and a comparative prior art roof drill bit 200 as illustrated in FIGS. 11A and 11B, the present invention provides for enhanced evacuation of the drilling debris from the vicinity of the borehole. The following discussion refers, for the most part, to FIGS. 12A and 12B, and FIGS. 13A and 13B.

Figure 12A:
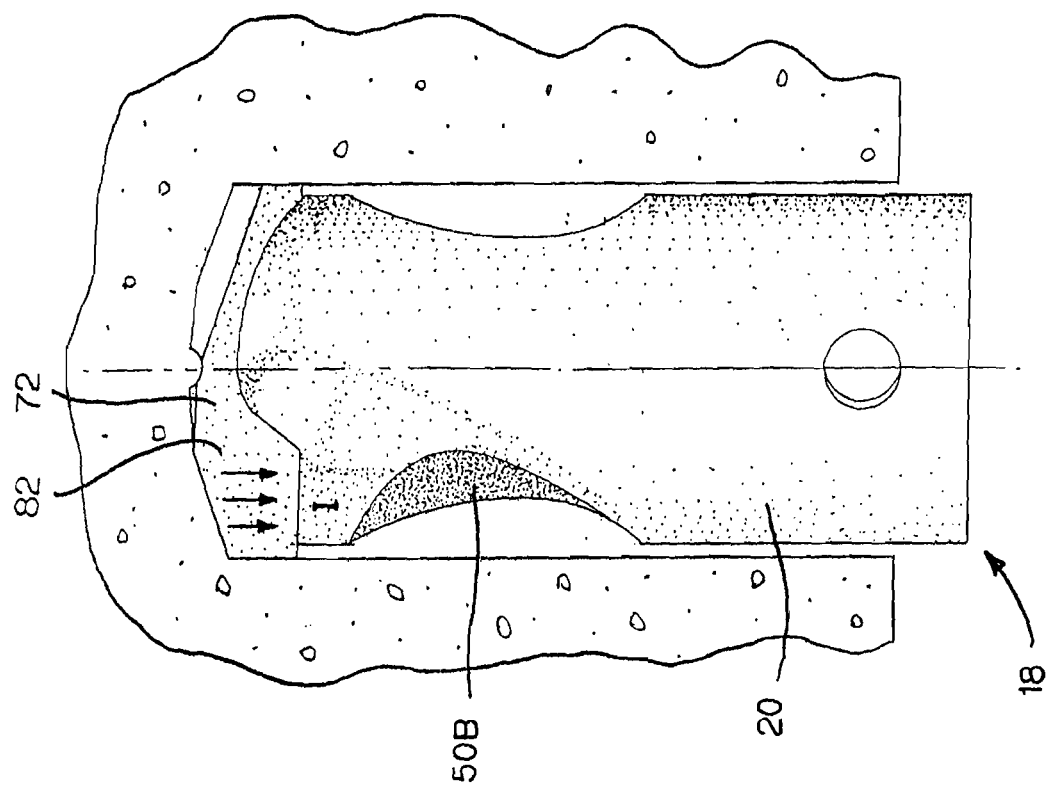
FIG. 12A is a side view of the specific embodiment of the roof drill bit of FIG. 6 wherein the roof drill bit is at one orientation within a borehole in the drilling operation.

FIG. 12A illustrates the inventive roof drill bit 18 in a borehole. The hard insert 72 cuts or drills the earth strata. This cutting by the hard insert 72 generates drilling debris, which arrows "I" represent in FIG. 12A. As a skilled artisan can appreciate, the drilling debris begins to fall downward (i.e., in the direction of arrows I) after generation thereof. Referring to FIG. 12B, even though the roof drill bit 18 rotates at high speeds (e.g., 650 rpm), the drilling debris "I" passes directly into the dust port 50B. This occurs because the leading surface 82 is rotationally forward of the central longitudinal axis (D-D) of the dust port 50B. When the leading surface 82 is rotationally forward of the central longitudinal axis D-D of the dust port 50B, the drilling debris has a longer time (as compared to a prior art roof drill bit) to fall a distance sufficient to enter the dust port under the influence of a vacuum. This relationship is sent out earlier herein. It is apparent that a meaningful advantage exists because the leading surface 82 of the hard insert 72 is rotationally forward of the central longitudinal axis D-D of dust port 50B.

In this specific embodiment, the preferred orientation of the hard insert 72 relative to the dust port 50B is where the central axis of the hard insert 72 is transversely coaxial with the central longitudinal axis D-D of the dust port 50B. This is the arrangement illustrated in FIGS. 12A and 12B, as well as in other drawings herein. Here, the leading surface 82 is rotationally forward of the central longitudinal axis D-D of dust port 50B a distance equal to one half the thickness of the hard insert 72. Another alternative is that the extent the leading surface 82 is rotationally forward of the central longitudinal axis D-D of dust port 50B is equal to greater than one-half the thickness of the hard insert 72.

Referring to FIGS. 11A, 11B, and 13A and 13B, the prior art roof drill bit is generally designated as 200. Roof drill bit 200 has a roof drill bit body 202 with a top end 204 and a bottom end 206. A transverse slot 210 is at the top end 204 and carries a hard insert 212. Hard insert 212 has a leading surface 214. The roof drill bit body 202 contains a pair of opposite dust ports to 220.

As illustrated in FIG. 11A, dust port 200 has a central longitudinal axis J-J. A line K-K, which is generally parallel to central longitudinal axis J-J, passes along the leading surface 214 of the hard insert 212. The leading surface 214 is rotationally rearward of the central longitudinal axis J-J of the dust port 220. The extent that the leading surface 214 is rotationally rearward of the central longitudinal axis J-J is a distance "L".

Figure 13A:
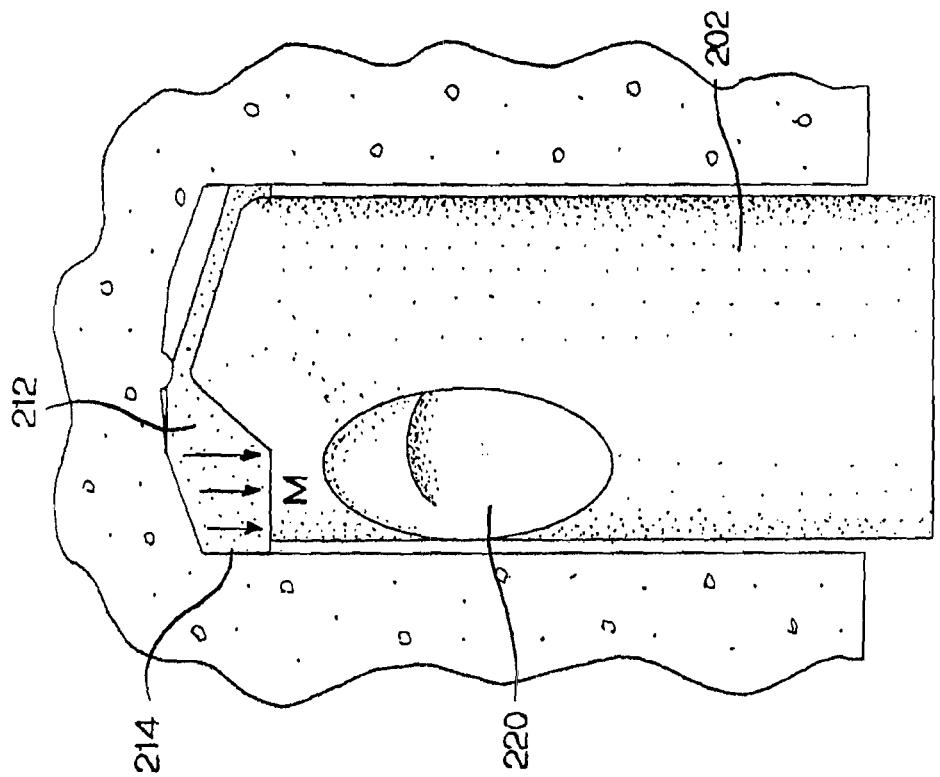
FIG. 13A is a side view of the specific embodiment of the PRIOR ART roof drill bit of FIGS. 11A and 11B wherein the roof drill bit is at one orientation within a borehole in the drilling operation.

Referring to FIGS. 13A and 13B, FIG. 13A illustrates the prior art roof drill bit 200 in a borehole. The hard insert 212 cuts or drills the earth strata. This cutting by the hard insert 212 generates drilling debris, which arrows "M" represent in FIG. 13A. As a skilled artisan can appreciate, the drilling debris begins to fall downward (i.e., in the direction of arrows M) after generation thereof. Referring to FIG. 13B, as mentioned above, the prior art roof drill bit 200 rotates at high speeds (e.g., 650 rpm). As a result, the drilling debris "M" does not enter directly into the dust port 220. This occurs because the leading surface 214 is rotationally rearward of the central longitudinal axis (J-J) of the dust port 220. When the leading surface 214 is rotationally rearward of the central longitudinal axis J-J of the dust port 220, the drilling debris does not have sufficient time to fall a distance sufficient to enter the dust port under the influence of a vacuum because the dust point has rotated past a point to directly receive the drilling debris. The result is that the drilling debris travels along the surface of the roof drill bit 200 until it reaches the opposite dust port. At this point, the drilling debris can enter the opposite dust port under the influence of a vacuum.

The fact that the drilling debris travels about the surface of the roof drill bit can cause problems. The first is that such travel can abrade or erode the roof drill bit body, which can result in early failure of the roof drill bit. The second is that the roof drill bit can become stuck in the borehole after stopping rotation. A more detailed description of these problems is set forth hereinabove.

This comparison between the inventive roof drill bit 18 and the prior art roof drill bit 200 clearly shows the significant advantages connected with the positioning of the hard insert (and especially the leading surface of the hard insert) relative to the dust port.

A comparison test was conducted to demonstrate the difference in the ability of the inventive roof drill bit to evacuate drilling debris as compared to a prior art roof drill bit. The test was set up by placing the sample roof drill bits in a simulated borehole. The roof drill bits were rotated at the same speed (i.e., 670 rpm) and an equal volume of sand (i.e., 57.75 cubic inches) was poured into the top of the simulated borehole to replicate the generation of drilling debris in drilling a borehole equal to 5.78 inches. Table 1 below sets forth the test results, which show that a roof drill bit like the specific embodiment exhibits improved performance as compared to a conventional roof drill bit.

TABLE 1

Comparative Test Results for Roof Drill Bits

| Parameter | Standard Roof Drill Bit | Specific Embodiment of the Roof Drill Bit |
|---|---|---|
| Rotational speed (Revolutions per minute) | 670 | 670 |
| Sand Volume (cubic inches) | 57.75 | 57.75 |
| Hole Depth for Equal Volume (feet) | 5.78 | 5.78 |
| Start to clear time (seconds) | 32.19 | 26.6 |
| Feet per minute based on volume | 10.77353215 | 13.03759398 |

The time to clear all of the sand from the borehole was measured to ascertain the efficiency of the roof drill bit to evacuate drilling debris. As is apparent, the inventive roof drill bit took 26.6 seconds, as compared to 32.19 seconds by the prior art roof drill bit, to clear out all of the sand. This translates into a drilling speed of 13.03759398 feet per minute as compared to 10.77353215 feet per minute for the prior art roof drill bit. These test results establish the significant performance improvement attributable to the inventive roof drill bit.

It is apparent that the present invention provides an improved roof drill bit based upon a number of different advantages. One such advantage concerns the improved ability of the inventive roof drill bit to evacuate drilling debris from the vicinity of the borehole. By doing so, the inventive roof drill overcomes problems common to earlier roof drill bits. These problems include excessive abrasive wear on the surface of the drill bit body. These problems also include an increase in the tendency of the roof drill bit to become stuck once the roof drill bit ceases operation. As one can appreciate, these difficulties decrease the overall production efficiency of the mining operation. Thus, the present inventive roof drill bit increases the overall efficiency of the roof bolt drilling operation. This is important in light of the inherently dangerous working environment of an underground mine during the roof bolting operation with an unsupported roof.

Another such advantage concerns the ability of the roof drill bit to retain the hard carbide hard insert. The present inventive roof drill bit provides a geometry that increases braze joint area, which leads to an increase in braze joint strength. Such an increase in braze joint strength facilitates better retention of the hard insert to the roof drill bit body. The present roof drill bit also provides for a full support of the roof drill bit body along the bottom surface of the hard insert. This feature increases the ability of the roof drill bit to retain the hard insert. Better drilling efficiencies result from using a roof drill bit with better retention of the hard insert (or cutting member) thereto.

The patents and other documents identified herein are hereby incorporated by reference herein. Other embodiments of the invention will be apparent to those skilled in the art from a consideration of the specification or a practice of the invention disclosed herein. It is intended that the specification and examples are illustrative only and are not intended to be limiting on the scope of the invention. The true scope and spirit of the invention is indicated by the following claims.

What is claimed is:

1. A roof drill bit comprising:

an elongate roof drill bit body having a forward end and a rearward end, the roof drill bit body containing a slot at the forward end, and the roof drill bit body containing a dust port wherein the dust port having a central longitudinal dust axis;

the roof drill bit further having a hard insert received within the slot, and the hard insert having a leading surface; and the leading surface of the hard insert being rotationally forward of the central longitudinal dust axis of the dust port for the entire axial length of the dust port wherein the leading surface of the hard insert being in direct operative communication with the dust port.

2. The roof drill bit according to claim 1 wherein the leading surface of the hard insert being between about 5 degrees and about 25 degrees rotationally forward of the central longitudinal dust axis of the dust port.

3. The roof drill bit according to claim 1 wherein the leading surface of the hard insert being between about 10 degrees and about 20 degrees rotationally forward of the central longitudinal dust axis of the dust port.

4. The roof drill bit according to claim 1 wherein the leading surface of the hard insert is about 15 degrees rotationally forward of the central longitudinal dust axis of the dust port.

5. The roof drill bit according to claim 1 wherein the central longitudinal dust axis having an orientation to pass through the hard insert.

6. The roof drill bit according to claim 1 wherein the leading surface of the hard insert lying in a plane passing through the dust port.

7. A roof drill bit body comprising:

an elongate body member having a forward end and a rearward end, the elongate body member containing a slot in the forward end thereof whereby the slot bisects the forward end of the elongate body member into opposite symmetric portions;

the roof drill bit body further containing an interior bore therein wherein the interior bore having an inside transverse dimension;

the roof drill bit body containing a pair of dust ports wherein each one of the dust ports corresponds with a corresponding symmetric portion;

each of the symmetric portions having a twisted helical surface, and the twisted helical surface having an axial rearward termination at the dust port corresponding with the twisted helical surface;

each one of the twisted helical portions having a minimum transverse dimension at the axial rearward termination of the twisted helical portion; and the sum of the minimum transverse dimensions of the pair of the twisted helical portions being less than or equal to the inside transverse dimension of the interior bore in the roof drill bit body.

8. The roof drill bit body according to claim 7 wherein twisted helical portion has a helix angle equal to between about 10 degrees and about 50 degrees.

9. The roof drill bit body according to claim 7 wherein twisted helical portion has a helix angle equal to about 30 degrees.

10. The roof drill bit body according to claim 7 wherein the slot having opposite surface surfaces, one of the side surfaces terminating at one of the twisted helical surfaces corresponding to one of the dust ports, and other of the side surfaces terminating at other of the twisted helical surfaces corresponding to other of the dust ports; the one dust port having one central longitudinal dust axis wherein the one side surface being rotationally forward of the one central longitudinal dust axis of the one dust port for entire axial length of the one dust port; and the other dust port having other central longitudinal dust axis wherein the other side surface being rotationally forward of the other central longitudinal dust axis of the other dust port for entire axial length of the other dust port.

11. A roof drill bit comprising:

an elongate body member having a forward end and a rearward end, the elongate body member containing a slot in the forward end thereof whereby the slot bisects the forward end of the elongate body member into opposite symmetric portions;

the roof drill bit body further containing an interior bore therein wherein the interior bore having an inside transverse dimension;

the roof drill bit body containing a pair of dust ports wherein each one of the dust ports corresponds with a corresponding symmetric portion;

each of the symmetric portions having a twisted helical surface, and the twisted helical surface having an axial rearward termination at the dust port corresponding with the twisted helical surface;

each one of the twisted helical portions having a minimum transverse dimension at the axial rearward termination of the twisted helical portion;

the sum of the minimum transverse dimensions of the pair of the twisted helical portions being equal to less than the inside transverse dimension of the interior bore in the roof drill bit body;

the roof drill bit further having a hard insert received within the slot, and the hard insert having a leading surface; and the leading surface of the hard insert being rotationally forward of the central longitudinal dust axis of the dust port for the entire axial length of the dust port.

12. The roof drill bit according to claim 11 wherein the hard insert having a bottom surface with opposite transverse ends, and the bottom surface having one transverse surface adjacent one of the transverse ends and another transverse surface adjacent the other of the transverse ends, and the bottom surface having a mediate arched portion mediate of and contiguous with the one transverse surface and the other transverse surface.

13. The hard insert according to claim 12 wherein the bottom surface of the hard insert body having an axial bottom surface length, and between about 80 percent and about 98 percent of the axial bottom surface length of the hard insert body being supported by the roof drill bit body.

14. The hard insert according to claim 12 wherein the bottom surface of the hard insert body having an axial bottom surface length, and at least about 92.3 percent of the axial bottom surface length of the hard insert body being supported by the roof drill bit body.

15. The roof drill bit according to claim 11 wherein the leading surface of the hard insert being between about 5 degrees and about 25 degrees rotationally forward of the central longitudinal dust axis of the dust port.

16. The roof drill bit according to claim 11 wherein the leading surface of the hard insert being between about 10 degrees and about 20 degrees rotationally forward of the central longitudinal dust axis of the dust port.

17. The roof drill bit according to claim 11 wherein the leading surface of the hard insert is about 15 degrees rotationally forward of the central longitudinal dust axis of the dust port.

* * * * *